United States Patent [19]

Alesso et al.

[11] Patent Number: 4,911,467
[45] Date of Patent: Mar. 27, 1990

[54] REAR SUSPENSION FOR MOTOR VEHICLES, OF THE TYPE WITH INDEPENDENT WHEELS AND LONGITUDINAL ARMS

[75] Inventors: Guido Alesso, Savigliano; Gian Luigi Perello, Strambino, both of Italy

[73] Assignee: Fiat Auto S.p.A., Turin, Italy

[21] Appl. No.: 273,445

[22] Filed: Nov. 18, 1988

[30] Foreign Application Priority Data

Dec. 30, 1987 [IT] Italy ............................. 68148 A/87

[51] Int. Cl.⁴ .......................... B60G 3/18; B62D 7/14
[52] U.S. Cl. .................................... 280/690; 280/691
[58] Field of Search ............. 280/688, 725, 685, 686, 280/718, 721, 722, 724, 690, 691

[56] References Cited

U.S. PATENT DOCUMENTS

| | | | |
|---|---|---|---|
| 2,574,199 | 11/1951 | Tandler et al. | 280/688 |
| 4,708,361 | 11/1987 | Takada et al. | 280/691 |
| 4,799,703 | 1/1989 | Mueller et al. | 280/91 |

Primary Examiner—Richard A. Bertsch
Attorney, Agent, or Firm—Sughrue, Mion, Zinn, Macpeak & Seas

[57] ABSTRACT

A rear suspension for motor vehicles of the type with independent wheels and longitudinal arms is described. The support (2) for each rear wheel is connected to a longitudinal arm (4) articulated at its front end to the substructure of the motor vehicle. The wheel support (2) is connected to the longitudinal arm (4) by means of a pair of superposed, spaced-apart joints (16, 17) which define a steering axis of the support. The latter is also provided with an arm (19) to which a steering control rod (21) is connected. To the outer side of the longitudinal arm (4) is fixed the end of an auxiliary arm (11) which extends obliquely and forwardly and whose opposite end is articulated to the substructure of the motor vehicle by means of a connecting rod member (13). The longitudinal arm is also connected to the substructure of the motor vehicle by means of a transverse arm (23).

4 Claims, 5 Drawing Sheets

REAR SUSPENSION FOR MOTOR VEHICLES, OF THE TYPE WITH INDEPENDENT WHEELS AND LONGITUDINAL ARMS

BACKGROUND OF THE INVENTION

The present invention relates to rear suspensions for motor vehicles, of the type with independent wheels, in which the support for each wheel is connected to a longitudinal arm articulated at its front end to the motor vehicle structure with the interposition of a bush of resiliently deformable material.

SUMMARY OF THE INVENTION

The object of the present invention is to provide a rear suspension which is usable both for non-steered wheels and for steered wheels, which ensures a high degree of stability of the motor vehicle, and which at the same time is of small bulk in the vertical direction.

In order to achieve this object, the invention provides a suspension of the type indicated above, characterised by the combination of the following characteristics:

(a) the wheel support is connected to the longitudinal arm by means of a pair of superposed, spaced-apart joints which define a steering axis of the wheel support, (b) the wheel support is provided with an arm to which a steering control rod is connected, (c) to the longitudinal arm is fixed the end of an auxiliary arm which extends forwardly and whose opposite end is articulated to the structure of the motor vehicle by means of a connecting rod, (d) a transverse arm is provided and is articulated at its ends to the longitudinal arm and to the motor vehicle structure respectively.

In a preferred embodiment, the longitudinal arm has a sheet-metal box structure.

BRIEF DESCRIPTION OF THE DRAWINGS

Further characteristics and advantages of the present invention will become apparent from the description which follows with reference to the appended drawings, provided purely by way of non-limiting example, in which.

DETAILED DESCRIPTION OF THE INVENTION

The drawings illustrate only the right-hand part of the suspension, it being understood that the left-hand part is symmetrical to that illustrated.

The right-hand rear wheel of the motor vehicle is generally indicated 1 and is supported by a support 2. The latter is connected and guided relative to a frame 3 intended to be fixed to the motor vehicle body by means of a longitudinal arm 4.

In accordance with the terminology usually used by experts in the art, the expression "longitudinal arm" is used in the present description and in the following claims to indicate an arm extending substantially in a direction parallel to the longitudinal axis of the motor vehicle. Moreover, the term "transverse" will be used below to indicate a horizontal direction transverse the longitudinal axis of the motor vehicle.

Figure 1:
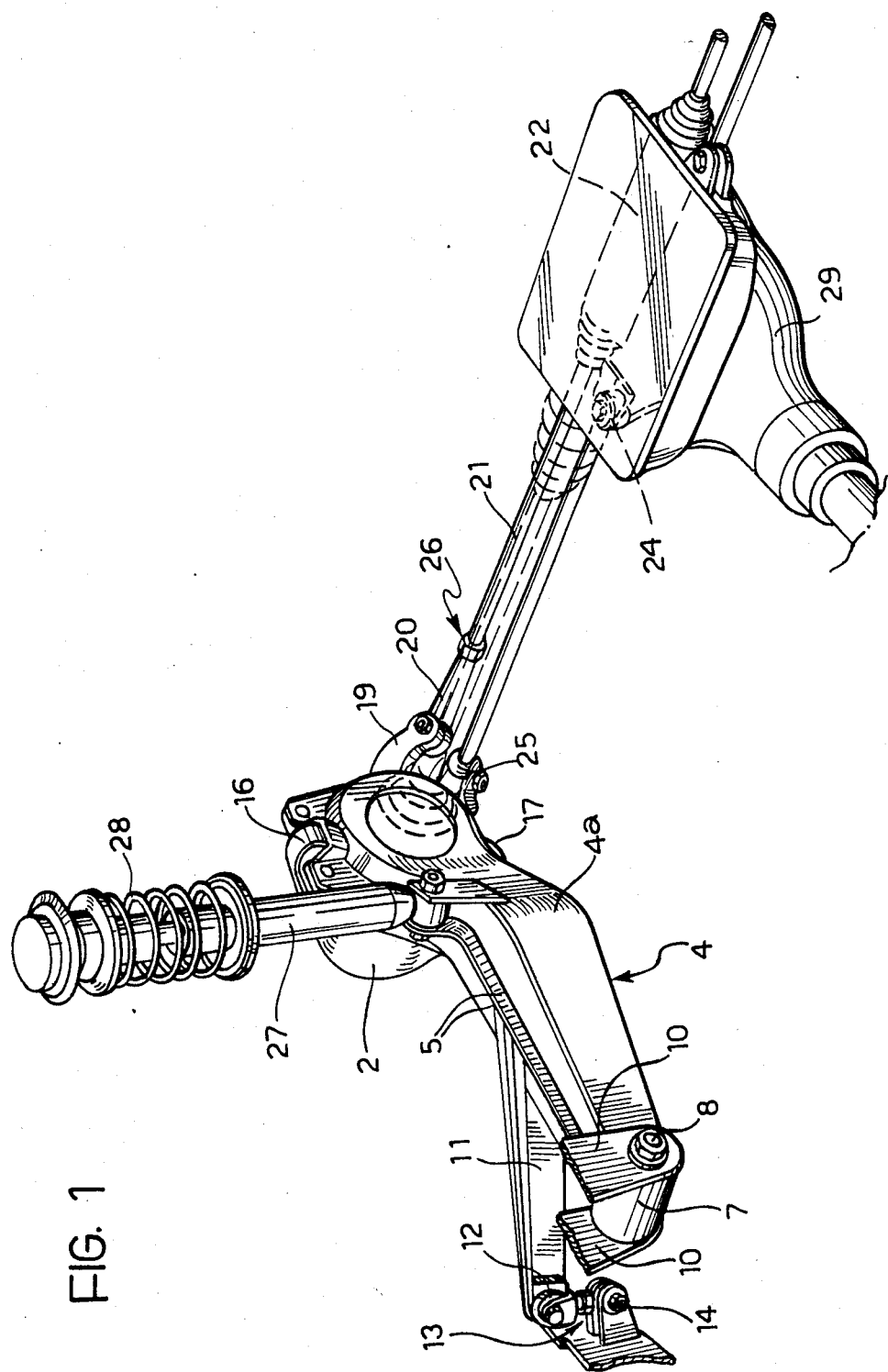
FIGS. 1 and 2 illustrate two perspective views of the suspension according to the invention.
Figure 2:
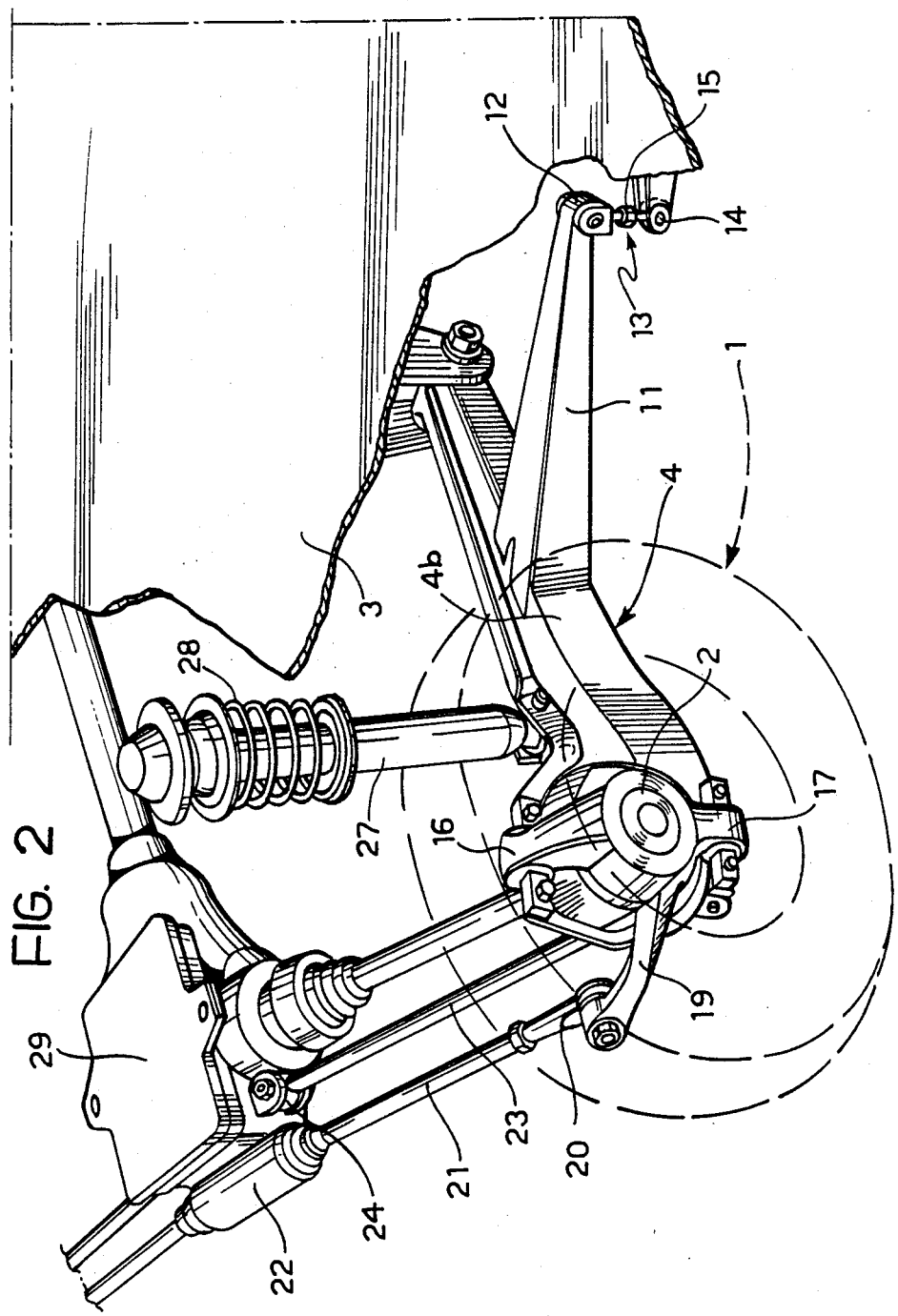
Figure 3:
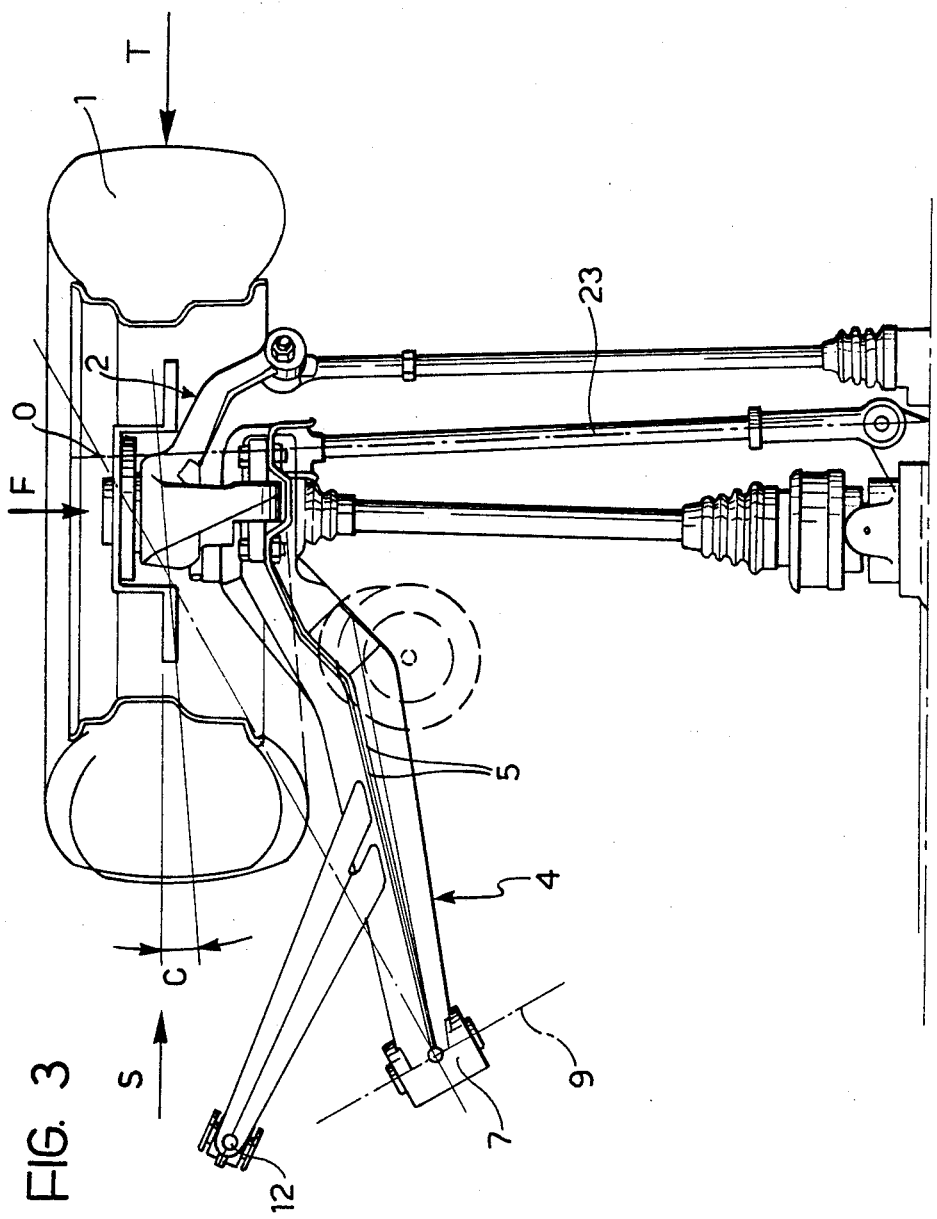
FIGS. 3 to 5 illustrate respectively a plan view, a front view and a side view of the suspension of Figures.

In the embodiment illustrated, the longitudinal arm 4 has a sheet-metal box structure constituted by two half-shells 4a, 4b provided with upper and lower pairs of flanges 5, 6 welded together. The front end (with reference to the direction of forward movement of the motor vehicle) of the longitudinal arm 4 is welded to a metal tube 7 containing a resilient bush mounted on a pin 8. The pin 8 is connected to the frame 3 by means of brackets 10. The articulation axis of the bush 7 is indicated 9 (FIG. 3). This axis—in the embodiment illustrated—is inclined both to the longitudinal axis and to a horizontal direction perpendicular to the longitudinal axis. To the outer half-shell 4b of the longitudinal arm 4 is welded the end of an auxiliary arm 11 which extends obliquely and forwardly and whose opposite end is connected by a ball joint 12 to the end of a connecting rod member 13. The opposite end of this connecting rod member 13 is articulated at 14 to the frame 3. The connecting rod member 13 has a regulating device 15 with a threaded coupling for regulating the camber of the wheels. The device 15 is not illustrated in detail since it is of known type. The auxiliary arm 11 also has a sheet-metal box structure.

Figure 4:
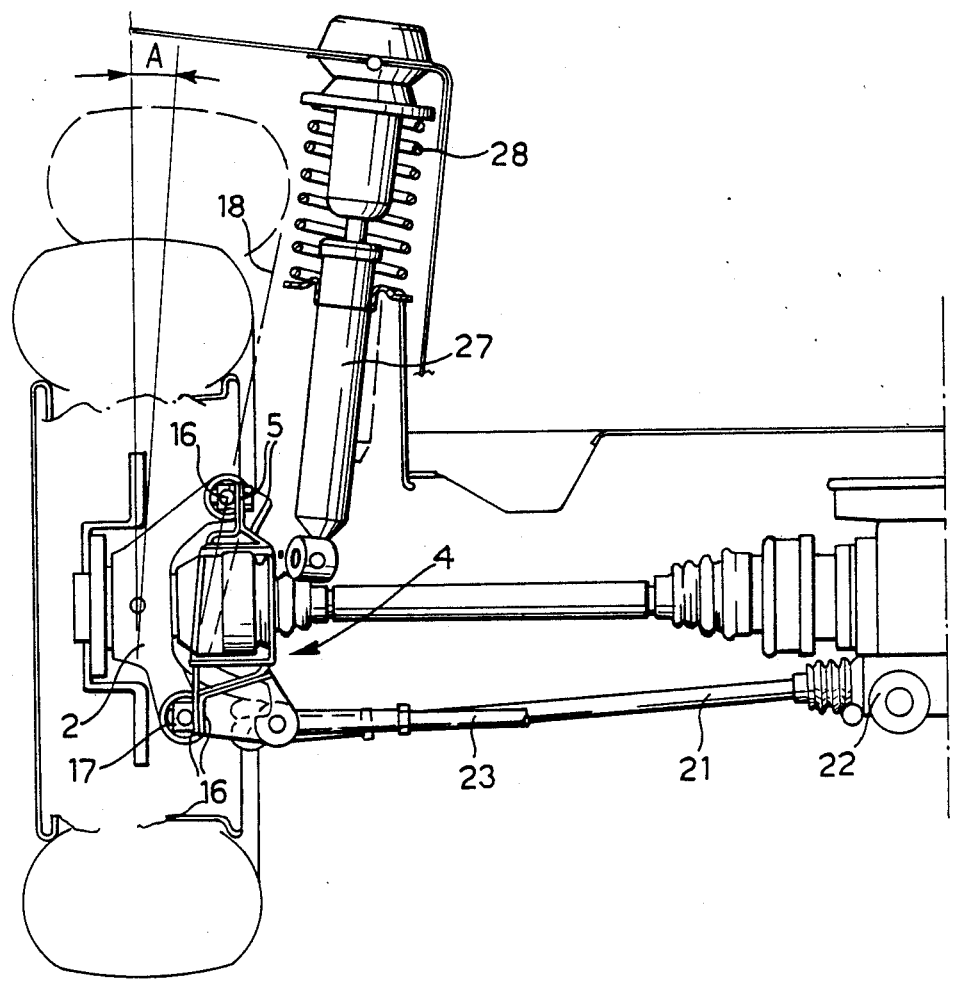

The wheel support 2 is connected to the longitudinal arm 4 by means of a pair of ball joints 16, 17 spaced apart one above the other. The joints 16, 17 define a steering axis 18 (FIG. 4) of the support 2. This support has an arm 19 to which is articulated the end 20 of a steering control rod 21 the opposite end of which is articulated to an actuator 22. The suspension finally includes a transverse arm 23 connected by a ball joint 24 at one of its ends to the structure of the motor vehicle and articulated at 25 to the structure of the longitudinal arm 4 close to the rear end thereof. The steering rod 21 is also provided with a device 26 for adjusting its length. Finally, a shock-absorber cylinder and a helical spring disposed between the longitudinal arm 4 and the motor vehicle structure are indicated 27 and 28.

The suspension according to the invention can be applied both to motor vehicles with non-driven rear wheels and to motor vehicles with driven rear wheels. In the latter case, the actuator 22 and the support of the joint 24 of the transverse arm 23 may be supported by the structure of the rear differential 29 of the motor vehicle, as in the embodiment illustrated.

When the motor vehicle is moving, the vertical movements of the wheel, because of the particular geometry of the suspension described above, cause the wheelbase of the motor vehicle, the track and the camber of the rear wheels to vary. In particular, when the longitudinal arm 4 rotates about its front articulation, it causes a displacement of the wheel axis along the longitudinal axis of the motor vehicle, causing a variation in the wheelbase. At the same time, the connection constituted by the transverse arm 23 causes the arm 4 to oscillate in a horizontal plane, allowed by the resilience of the rubber bush contained in the sleeve 7, causing a variation in the track. Simultaneously, the connection constituted by the auxiliary arm 11 and the connecting rod member 13 causes a rotation of the auxiliary arm 4 about the axis passing through the articulation 7 and the articulation 25 with a consequent variation in the camber. The suspension is designed so that these variations occur in the sense favourable to the stability of the motor vehicle.

Figure 5:
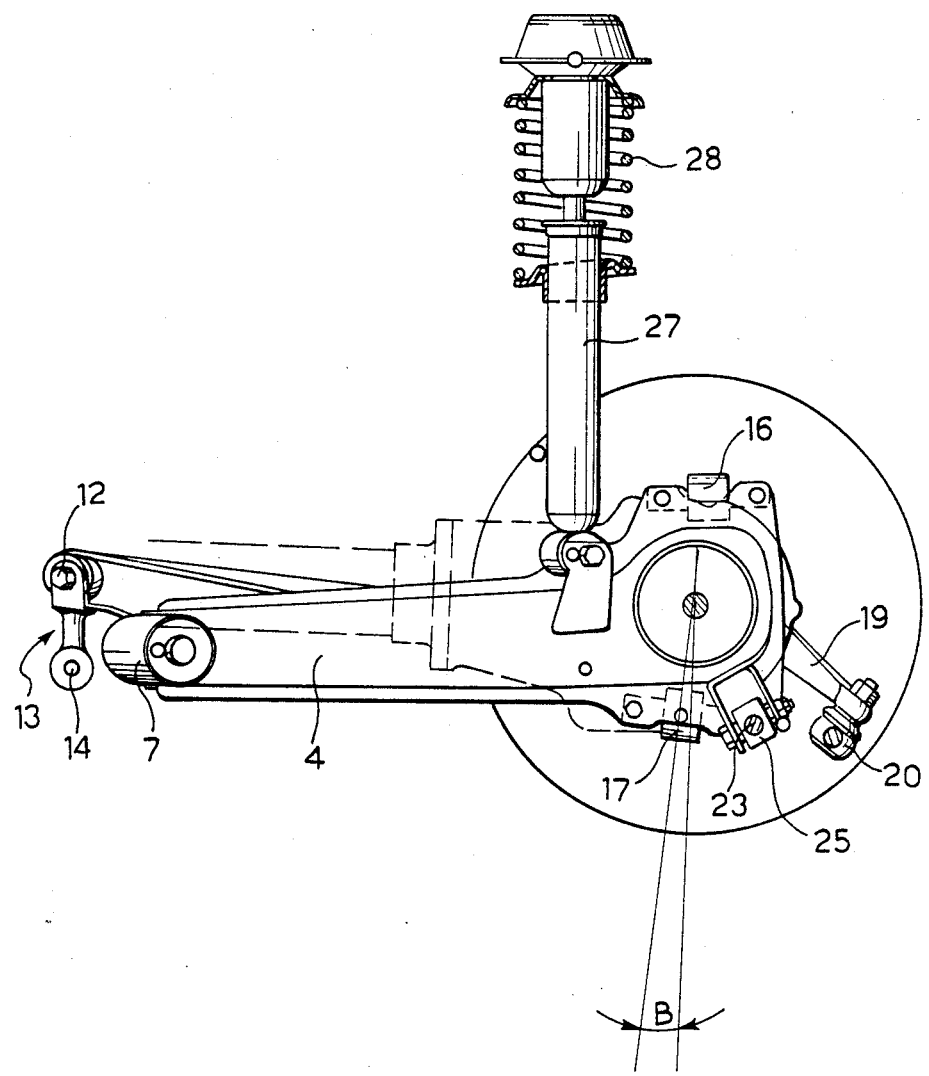

The adjustment of the length of the rod 21 in the stage of manufacture or setting up enables the angle of convergence of the wheels to be regulated. A variation in convergence is also caused automatically as a result of the vertical movements of the wheel. In fact, since the articulation 24 and the articulation of the rod 21 to the actuator 22 are staggered, the support 2 is forced to rotate about the axis 18. In conclusion, the vertical movements of the wheel generate a variation in the angle of convergence of the wheel, in the angle of the camber (indicated A in FIG. 4) and in the angle of incidence (indicated B in FIG. 5).

During movement of the vehicle around bends and in any event each time the wheel is subject to a lateral load F (FIG. 3), this load causes a slight rotation of the members of the suspension in the horizontal plane, which is permitted by the deformability of the rubber in the sleeve 7 in an axial sense. This deformability enables the arm 4 to rotate about a momentary centre of rotation 0 defined by the intersection of the axis of the transverse arm 23 with the straight line perpendicular to the axis 9 in correspondence with the articulation 7. In the embodiment illustrated, the force F causes the rotation of the arm 4 in an anti-clockwise sense with a consequent increase in the convergence of the wheel (the angle of convergence is indicated C in FIG. 3, with reference to the position of the wheel illustrated in broken outline). A similar effect occurs in the case of braking, corresponding to the application of a longitudinal force S to the support 2. An opposite effect occurs during acceleration, however, which causes the application of a longitudinal load P directed forwardly onto the support 2.

Naturally, the principle of the invention remaining the same, the constructional details and forms of embodiment may be varied widely with respect to that described and illustrated purely by way of example, without thereby departing from the scope of the present invention.

We claim:

1. A rear suspension for motor vehicles, of the type with independent wheels, in which each wheel has a wheel support connected to a longitudinal arm articulated at its front end to the structure of the motor vehicle with the interposition of a bush of resiliently deformable material wherein:

each wheel support is connected to the longitudinal arm by means of a pair of superposed, spaced-apart joints which define a steering axis of the wheel support;

each wheel support is provided with an arm to which a steering control rod is connected;

an auxiliary arm is fixed at one end to the longitudinal arm and extends forwardly with the opposite end articulated to the structure of the motor vehicle by means of a connecting rod;

a transverse arm is provided and is articulated at its ends to the longitudinal arm and to the motor vehicle structure respectively; and said auxiliary arm is disposed on the outside of the longitudinal arm and extends obliquely and forwardly, the front articulation of the longitudinal arm and the articulation of the connecting rod member to the structure of the motor vehicle being disposed on different axes.

2. A rear suspension for motor vehicles, of the type with independent wheels, in which each wheel has a wheel support connected to a longitudinal arm articulated at its front end to the structure of the motor vehicle with the interposition of a bush of resiliently deformable material wherein:

each wheel support is connected to the longitudinal arm by means of a pair of superposed, spaced-apart joints which define a steering axis of the wheel support;

each wheel support is provided with an arm to which a steering control rod is connected;

an auxiliary arm is fixed at one end to the longitudinal arm and extends forwardly with the opposite end articulated to the structure of the motor vehicle by means of a connecting rod;

a transverse arm is provided and is articulated at its ends to the longitudinal arm and to the motor vehicle structure respectively; and said longitudinal arm has a sheet-metal box structure.

3. A rear suspension for motor vehicles, of the type with independent wheels, in which each wheel has a wheel support connected to a longitudinal arm articulated at its front end to the structure of the motor vehicle with the interposition of a bush of resiliently deformable material wherein:

each wheel support is connected to the longitudinal arm by means of a pair of superposed, spaced-apart joints which define a steering axis of the wheel support;

each wheel support is provided with an arm to which a steering control rod is connected;

an auxiliary arm is fixed at one end to the longitudinal arm and extends forwardly with the opposite end articulated to the structure of the motor vehicle by means of a connecting rod;

a transverse arm is provided and is articulated at its ends to the longitudinal arm and to the motor vehicle structure respectively; and said articulation axis of the longitudinal arm to the motor vehicle structure is disposed obliquely both with respect to the longitudinal axis of the motor vehicle and with respect to the horizontal direction perpendicular to the longitudinal axis.

4. A rear suspension for motor vehicles, of the type with independent wheels, in which each wheel has a wheel support connected to a longitudinal arm articulated at its front end to the structure of the motor vehicle with the interposition of a bush of resiliently deformable material wherein:

each wheel support is connected to the longitudinal arm by means of a pair of superposed, spaced-apart joints which define a steering axis of the wheel support;

each wheel support is provided with an arm to which a steering control rod is connected;

an auxiliary arm is fixed at one end to the longitudinal arm and extends forwardly with the opposite end articulated to the structure of the motor vehicle by means of a connecting rod;

a transverse arm is provided and is articulated at its ends to the longitudinal arm and to the motor vehicle structure respectively; and said connecting rod member and the front articulation of the longitudinal arm are connected to an auxiliary frame intended to be fixed to the motor vehicle structure.

* * * * *